US012735086B2

(12) United States Patent
Lin

(10) Patent No.: US 12,735,086 B2
(45) Date of Patent: Sep. 15, 2026

(54) VERTICALLY-MOVABLE, TRANSMISSION-FRIENDLY, AND CONTROLLABLE STROLLER

(71) Applicant: New Century Products Co., Ltd., Taipei City (TW)

(72) Inventor: Fu-Tsun Lin, Taipei City (TW)

(73) Assignee: New Century Products Co., Ltd., Taipei City (TW)

( * ) Notice: Subject to any disclaimer, the term of this patent is extended or adjusted under 35 U.S.C. 154(b) by 250 days.

(21) Appl. No.: 18/743,876

(22) Filed: Jun. 14, 2024

(65) Prior Publication Data

US 2025/0010902 A1 Jan. 9, 2025

(30) Foreign Application Priority Data

Jul. 6, 2023 (CN) ......................... 202321763079.4

(51) Int. Cl.
*B62B 7/06* (2006.01)
*B62B 7/04* (2006.01)

(52) U.S. Cl.
CPC ................ *B62B 7/06* (2013.01); *B62B 7/042* (2013.01); *B62B 2206/06* (2013.01)

(58) Field of Classification Search
CPC B62B 3/02; B62B 3/022; B62B 3/148; B62B 3/1484; B62B 2206/06; B62B 7/06; B62B 7/062; B62B 7/10; B62B 9/12
See application file for complete search history.

(56) References Cited

U.S. PATENT DOCUMENTS

| | | | | |
|---|---|---|---|---|
| 4,887,836 A * | 12/1989 | Simjian | B62B 3/007 | 280/651 |
| 5,074,570 A * | 12/1991 | Ferris | B62B 3/1484 | D34/21 |
| 5,385,358 A * | 1/1995 | Adamson | B62B 3/148 | 280/47.35 |
| 5,857,695 A * | 1/1999 | Crowell | B62B 3/007 | 280/47.11 |
| 6,733,026 B1 * | 5/2004 | Robberson | B62B 3/007 | 280/30 |
| 7,703,795 B2 * | 4/2010 | Williamson | A01K 97/10 | 280/652 |
| 9,145,154 B1 * | 9/2015 | Horowitz | B62B 5/0013 | |

(Continued)

*Primary Examiner* — Jeffrey J Restifo
(74) *Attorney, Agent, or Firm* — HDLS IPR SERVICES; Chun-Ming Shih

(57) ABSTRACT

A vertically-movable, transmission-friendly, and controllable stroller includes a front wheel component, rear wheel component, frame, and rail component. The front wheel component includes a front wheel hanger, front lateral right and left wheels mounted on the bottom of the front wheel hanger. The rear wheel component includes a rear wheel hanger, rear lateral right and left wheels mounted on the bottom of the rear wheel hanger. The frame includes front, rear, right and left lateral subframes. The front lateral subframe has a bottom pivotally connected to the front wheel component. The rear lateral subframe has a bottom pivotally connected to the rear wheel component. The rail component includes front and rear right rails disposed on front and rear right lateral upright tubes respectively, allowing left and right ends of a right lateral top tube to be vertically slidingly connect between the front and rear right lateral upright tubes.

9 Claims, 10 Drawing Sheets

1

(56) References Cited

U.S. PATENT DOCUMENTS

| | | | | |
|---|---|---|---|---|
| 9,327,749 | B2 * | 5/2016 | Young | B62B 5/08 |
| 9,896,118 | B2 * | 2/2018 | Choi | B62B 3/007 |
| 10,414,422 | B2 * | 9/2019 | Choi | B62B 9/082 |
| 10,464,588 | B1 * | 11/2019 | Lin | B62B 7/08 |
| 11,465,664 | B1 * | 10/2022 | Choi | B62B 3/025 |
| 11,472,462 | B1 * | 10/2022 | Choi | B62B 7/105 |
| 11,772,698 | B2 * | 10/2023 | Cui | B62B 7/08 280/650 |
| 11,981,364 | B2 * | 5/2024 | Ma | B62B 5/0461 |
| 12,337,887 | B2 * | 6/2025 | Jiang | B62B 3/025 |
| 12,454,301 | B1 * | 10/2025 | Jiang | B62B 3/007 |
| 12,485,944 | B2 * | 12/2025 | Jiang | B62B 3/007 |
| 12,509,134 | B1 * | 12/2025 | Huang | B62B 3/007 |
| 12,568,927 | B1 * | 3/2026 | Bickel | A01K 1/0236 |
| 2018/0118243 | A1 * | 5/2018 | Fitzwater | B62B 7/008 |
| 2025/0010902 | A1 * | 1/2025 | Lin | B62B 7/042 |

* cited by examiner 333
41
D
335
F
336
331
45
332
E
422
334
42

VERTICALLY-MOVABLE, TRANSMISSION-FRIENDLY, AND CONTROLLABLE STROLLER

FIELD

The present disclosure relates to vertically-movable, transmission-friendly, and controllable strollers and, more particularly, to a vertically-movable, transmission-friendly, and controllable stroller which can function as a seat for a child to sit in and allow the child to enter and exit it conveniently.

BACKGROUND

Families with babies and toddlers usually own strollers to not only dispense with the hassles of carrying the babies and toddlers but also allow the babies and toddlers to sit or lie safely and comfortably in the strollers. Commercially-available strollers come in a wide variety of types. From the perspective of frame structures, a variety of collapsible strollers is available to consumers. From the perspective of constituent parts, child seats are fitted to main stroller frames by different means, and lightweight strollers are almost like chairs, but high-end strollers are each equipped with parts, such as a handle, canopy, and storage basket.

Owing to continuous social and technological advancement, increasingly convenient products are available to consumers; thus, consumers attach great importance to functions and lifecycles of the products. Parents usually carry a baby or toddler with a stroller. However, existing strollers have drawbacks as follows: allowing babies and toddlers to sit and sleep therein, albeit achieving just one single function; being too limited in space to allow babies and toddlers to enter and exit conveniently.

SUMMARY

In view of the aforesaid drawbacks of the prior art, it is an objective of the disclosure to provide a vertically-movable, transmission-friendly, and controllable stroller with a rail design for lowering a collapsible frame to turn the stroller into a seat for use by a baby, toddler or adult. Another objective of the disclosure is to provide a vertically-movable, transmission-friendly, and controllable stroller with an engaging element and an engaging slot, allowing the engaging element to movably engage with the engaging slot, so as for the baby or toddler to enter and exit the stroller conveniently upon separation of the engaging element from the engaging slot. Yet another objective of the disclosure is to provide a vertically-movable, transmission-friendly, and controllable stroller with a collapsible frame for collapsing the stroller and a handle having gears and gear recesses for use in multi-segment adjustment.

To achieve the above and other objectives, the disclosure provides a vertically-movable, transmission-friendly, and controllable stroller comprising a front wheel component, a rear wheel component, a frame and a rail component. The front wheel component comprises a front wheel hanger, a front lateral right wheel mounted on a bottom of the front wheel hanger, and a front lateral left wheel mounted on the bottom of the front wheel hanger. The rear wheel component comprises a rear wheel hanger, a rear lateral right wheel mounted on a bottom of the rear wheel hanger, and a rear lateral left wheel mounted on the bottom of the rear wheel hanger. The frame comprises a front lateral subframe, a rear lateral subframe, a left lateral subframe and a right lateral subframe. The front lateral subframe has a bottom pivotally connected to the front wheel component. The rear lateral subframe has a bottom pivotally connected to the rear wheel component. The left lateral subframe comprises a left lateral top tube, a left lateral chassis, a front left lateral upright tube and a rear left lateral upright tube. The right lateral subframe comprises a right lateral top tube, a right lateral chassis, a front right lateral upright tube and a rear right lateral upright tube. The rear lateral subframe connects to a handle. The handle extends toward the rear of the rear lateral subframe. The rail component comprises a front right rail and a rear right rail. The front right rail and the rear right rail are disposed on the front right lateral upright tube and the rear right lateral upright tube respectively such that the left and right ends of the right lateral top tube are vertically slidingly connected between the front right lateral upright tube and the rear right lateral upright tube. The front right rail and the rear right rail have thereon a front right slider and a rear right slider respectively. The left and right ends of the right lateral top tube are fixed to the front right slider and the rear right slider through a front right locking structure and a rear right locking structure respectively.

Advantages of the disclosure are as follows: first, the right lateral subframe is vertically-movable to thereby move upward to function as a conventional stroller and move downward to function as a sofa; second, the rear right locking structure and the locking structure are linked in such a way that unlocking the rear right locking structure manually can automatically unlock the locking structure through a linking movement structure, allowing the locking structure to be conveniently unlocked by one single person manually and facilitating the vertical movement of the right lateral top tube and the central upright tube.

DETAILED DESCRIPTION

Figure 1:
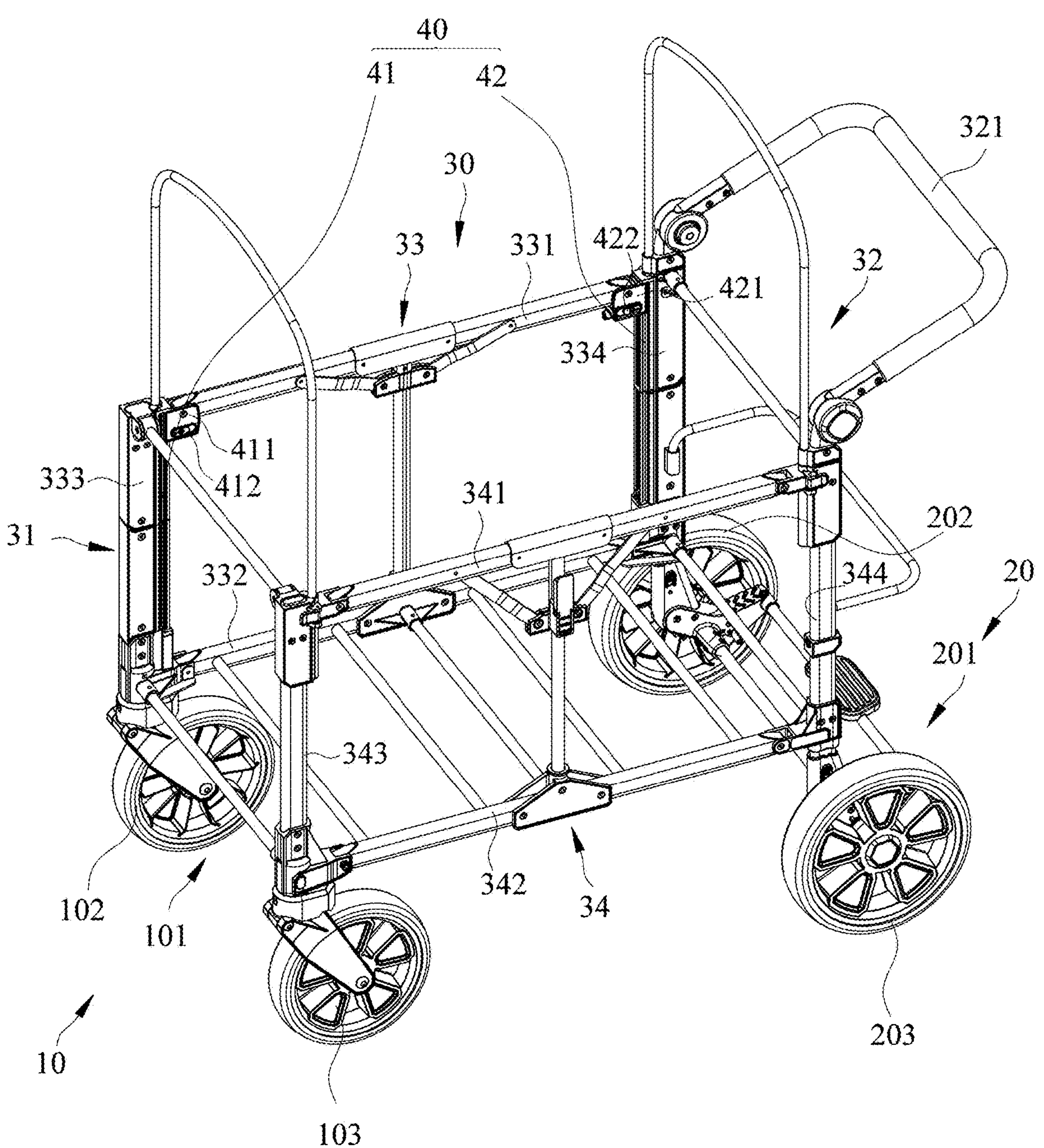
FIG. 1 is a perspective view of a vertically-movable, transmission-friendly, and controllable stroller according to the disclosure.

Referring to FIG. 1, there is shown a perspective view of a vertically-movable, transmission-friendly, and controllable stroller according to the disclosure.

As shown in FIG. 1, the disclosure provides a vertically-movable, transmission-friendly, and controllable stroller 1 comprising a front wheel component 10, a rear wheel component 20, a frame 30 and a rail component 40. The front wheel component 10 comprises a front wheel hanger 101, a front lateral right wheel 102 mounted on the bottom of the front wheel hanger 101, and a front lateral left wheel 103 mounted on the bottom of the front wheel hanger 101. The rear wheel component 20 comprises a rear wheel hanger 201, a rear lateral right wheel 202 mounted on the bottom of the rear wheel hanger 201, and a rear lateral left wheel 203 mounted on the bottom of the rear wheel hanger 201. The frame 30 comprises a front lateral subframe 31, a rear lateral subframe 32, a right lateral subframe 33 and a left lateral subframe 34. The front lateral subframe 31 has a bottom pivotally connected to the front wheel component 10. The rear lateral subframe 32 has a bottom pivotally connected to the rear wheel component 20. The right lateral subframe 33 comprises a right lateral top tube 331, a right lateral chassis 332, a front right lateral upright tube 333 and a rear right lateral upright tube 334. The left lateral subframe 34 comprises a left lateral top tube 341, a left lateral chassis 342, a front left lateral upright tube 343 and a rear left lateral upright tube 344. A handle 321 connects to the rear lateral subframe 32 and extends toward the rear of the rear lateral subframe 32. The rail component 40 comprises a front right rail 41 and a rear right rail 42. The front right rail 41 and the rear right rail 42 are disposed on the front right lateral upright tube 333 and the rear right lateral upright tube 334 respectively, allowing the left and right ends of the right lateral top tube 331 to be vertically slidingly connected between the front right lateral upright tube 333 and the rear right lateral upright tube 334. The front right rail 41 and the rear right rail 42 have thereon a front right slider 411 and a rear right slider 421 respectively. The two ends of the right lateral top tube 331 are fixed to the front right slider 411 and the rear right slider 421 by a front right locking structure 412 and a rear right locking structure 422 respectively.

Figure 2:
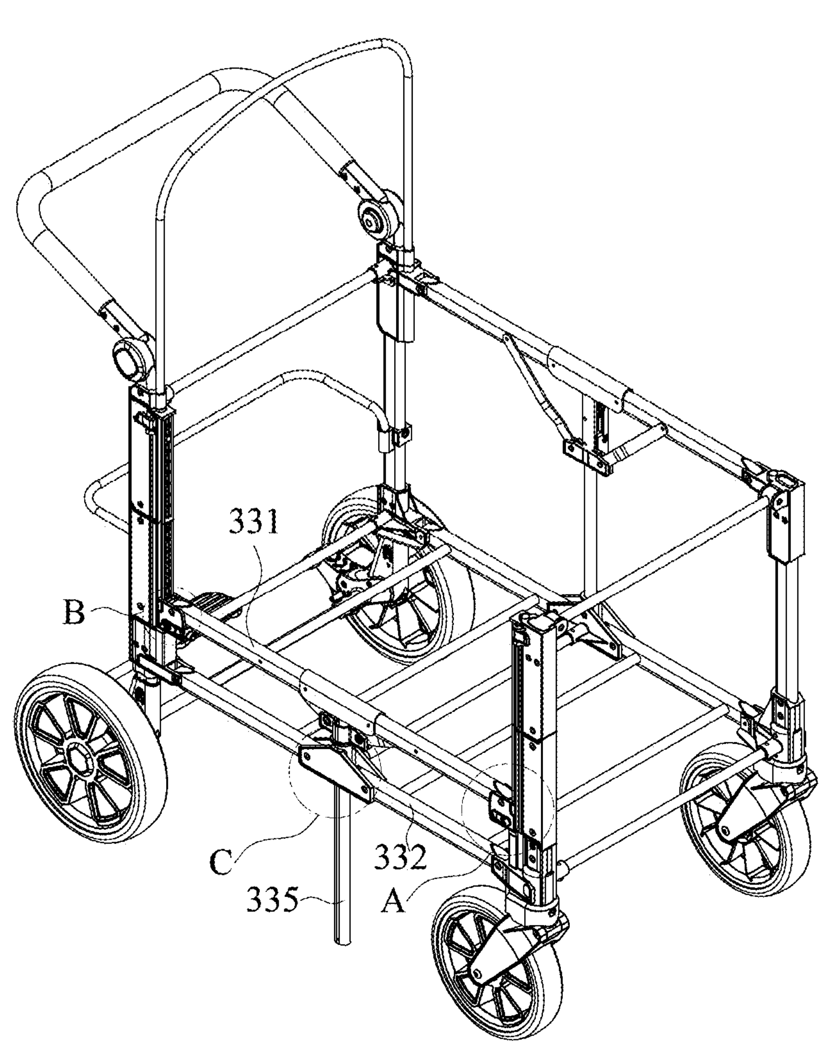
FIG. 2 is a perspective view of the vertically-movable, transmission-friendly, and controllable stroller regarding its operation according to embodiment 1 of the disclosure.
Figure 3:
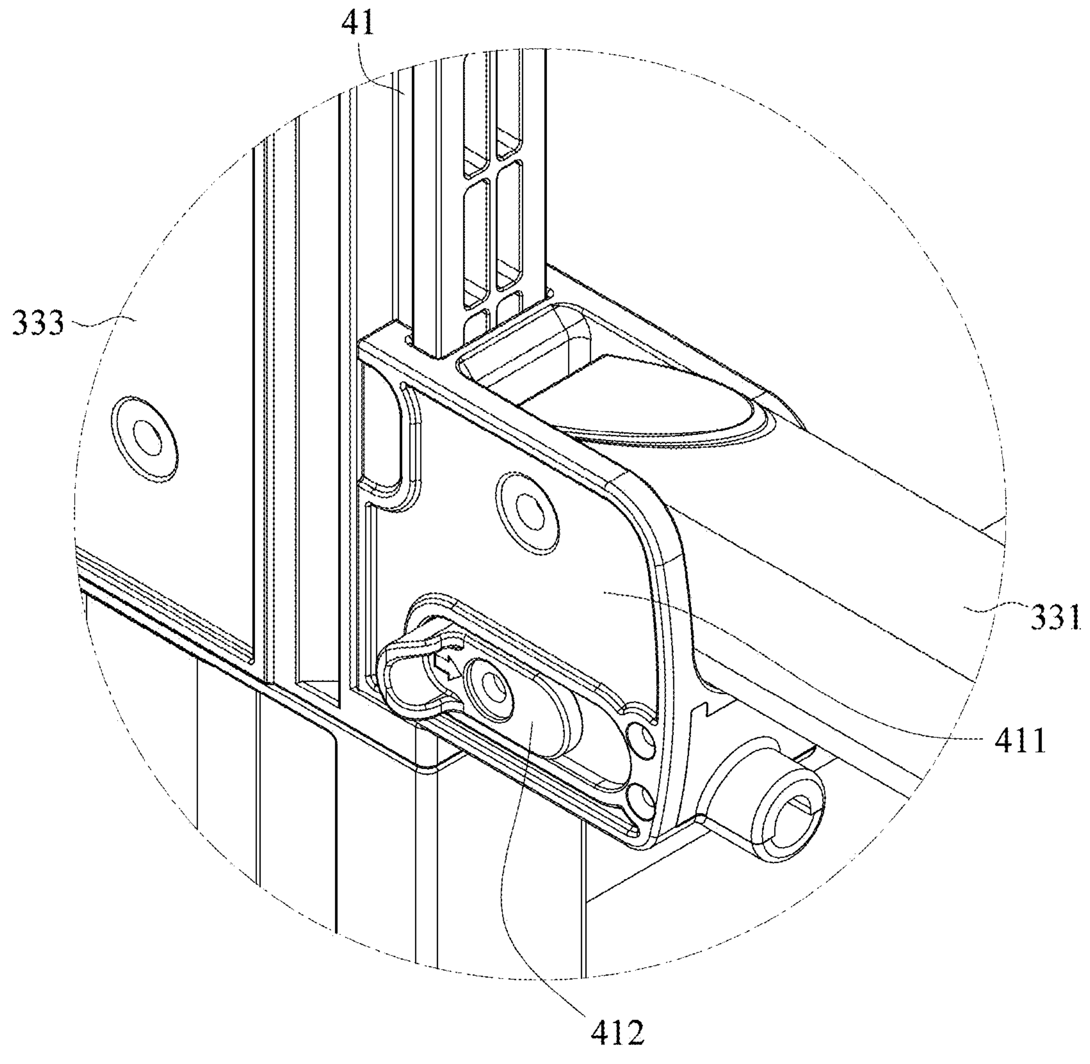
FIG. 3 is an enlarged view of part A in FIG. 2.
Figure 4:
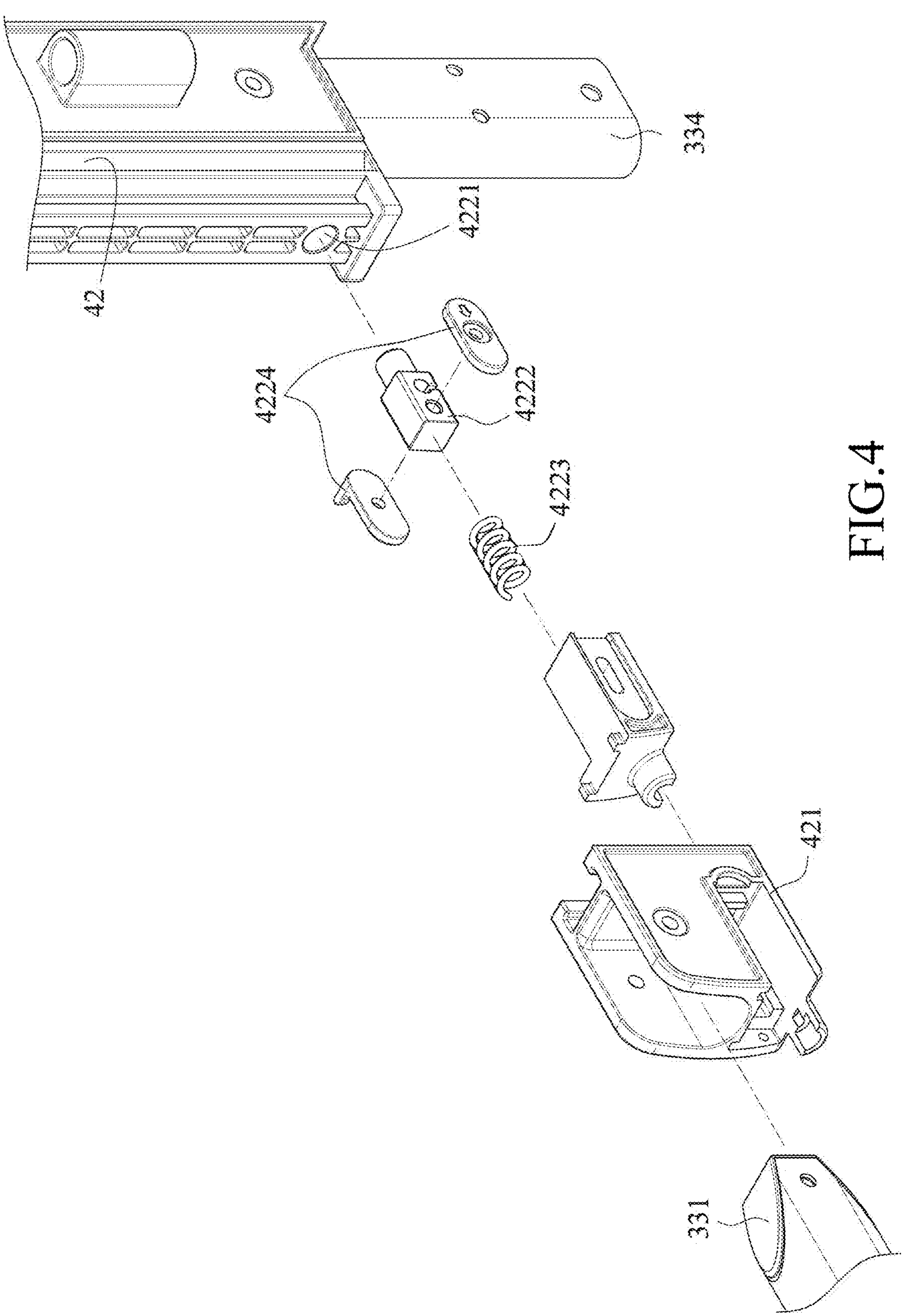
FIG. 4 is an exploded view of part B in FIG. 2.
Figure 5:
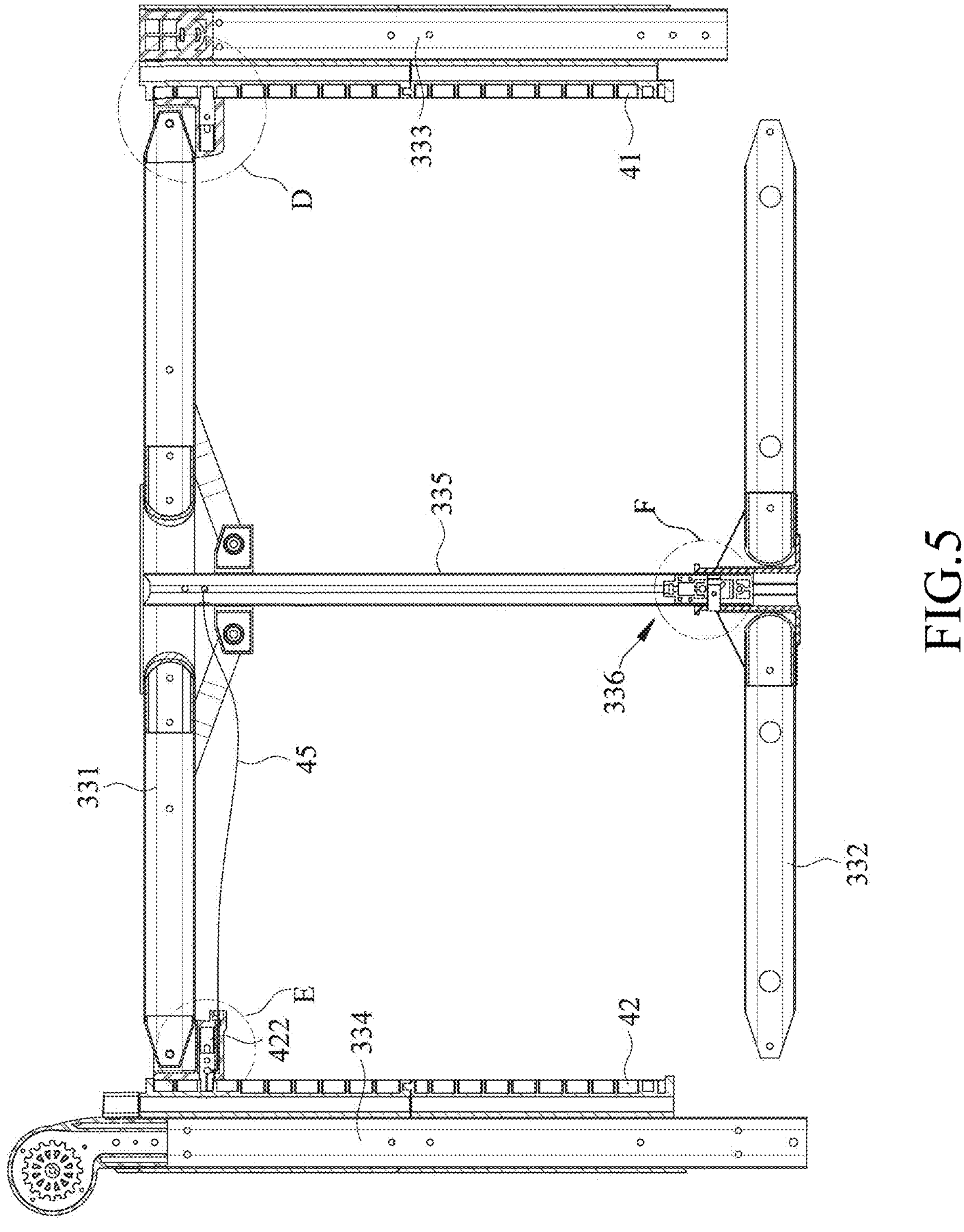
FIG. 5 is a cross-sectional view of a right lateral subframe of the vertically-movable, transmission-friendly, and controllable stroller according to the disclosure.
Figure 6:
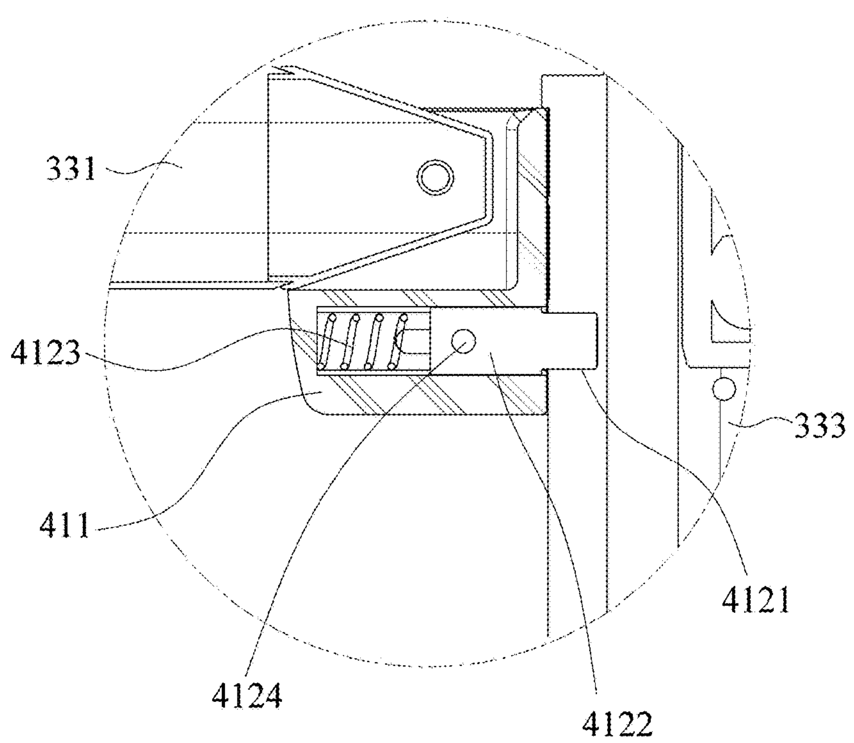
FIG. 6 is an enlarged view of part D in FIG. 5.
Figure 7:
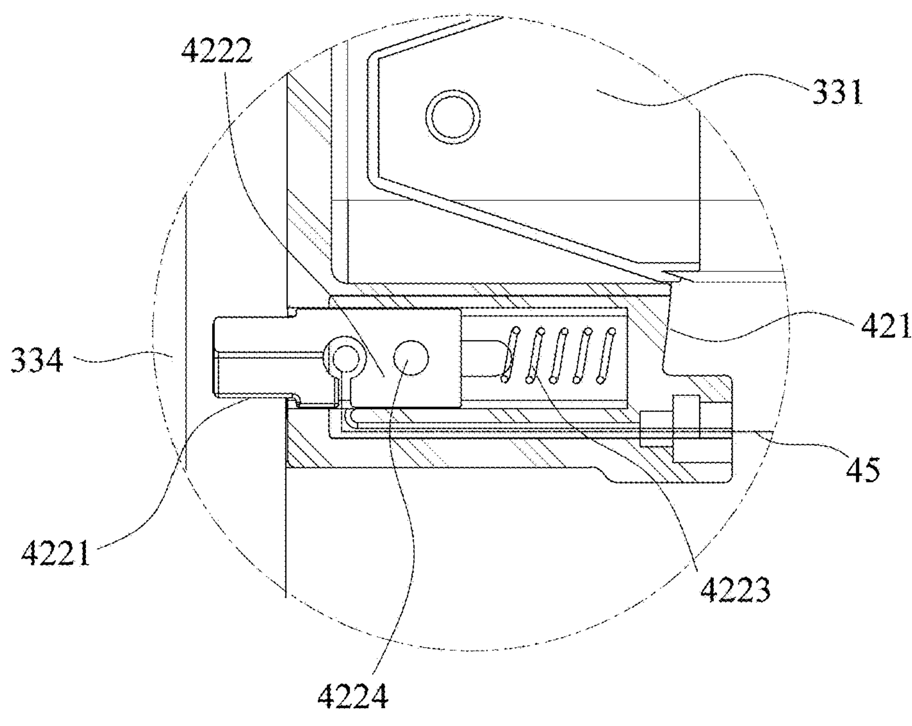
FIG. 7 is an enlarged view of part E in FIG. 5.

Refer to FIG. 2 through FIG. 7. FIG. 2 is a perspective view of the vertically-movable, transmission-friendly, and controllable stroller regarding its operation according to embodiment 1 of the disclosure. FIG. 3 is an enlarged view of part A in FIG. 2. FIG. 4 is an exploded view of part B in FIG. 2. FIG. 5 is a cross-sectional view of a right lateral subframe of the vertically-movable, transmission-friendly, and controllable stroller according to the disclosure. FIG. 6 is an enlarged view of part D in FIG. 5. FIG. 7 is an enlarged view of part E in FIG. 5.

As shown in FIG. 2, FIG. 3, FIG. 5 and FIG. 6, the front right locking structure 412 comprises a front right insertion hole 4121, a front right locking element 4122, a front right reset spring 4123 and a front right unlocking button 4124. The front right insertion hole 4121 is disposed on the front right lateral upright tube 333. The front right locking element 4122 slidingly in the left-right direction connects to the front right slider 411 and protrudes leftward into the front right insertion hole 4121. The front right reset spring 4123 is disposed between the front right locking element 4122 and the front right slider 411 and presses rightward against the front right locking element 4122. The front right locking element 4122 has the front right unlocking button 4124. The unlocking process of the front right locking structure 412 involves pulling the front right unlocking button 4124 manually toward the left and allowing the front right slider 411 to slide leftward to escape from the front right insertion hole 4121.

As shown in FIG. 2, FIG. 4, FIG. 5 and FIG. 7, the rear right locking structure 422 comprises a rear right insertion hole 4221, a rear right locking element 4222, a rear right reset spring 4223 and a rear right unlocking button 4224. The rear right insertion hole 4221 is disposed on the rear right lateral upright tube 334. The rear right locking element 4222 slidingly in the left-right direction connects to the rear right slider 421 and protrudes rightward into the rear right insertion hole 4221. The rear right reset spring 4223 is disposed between the rear right locking element 4222 and the rear right slider 421 and presses rightward against the rear right locking element 4222. The rear right locking element 4222 has the rear right unlocking button 4224. The unlocking process of the rear right locking structure 422 involves pulling the rear right unlocking button 4224 manually toward the right and allowing the rear right slider 421 to slide leftward to escape from the rear right insertion hole 4221.

Figure 8:
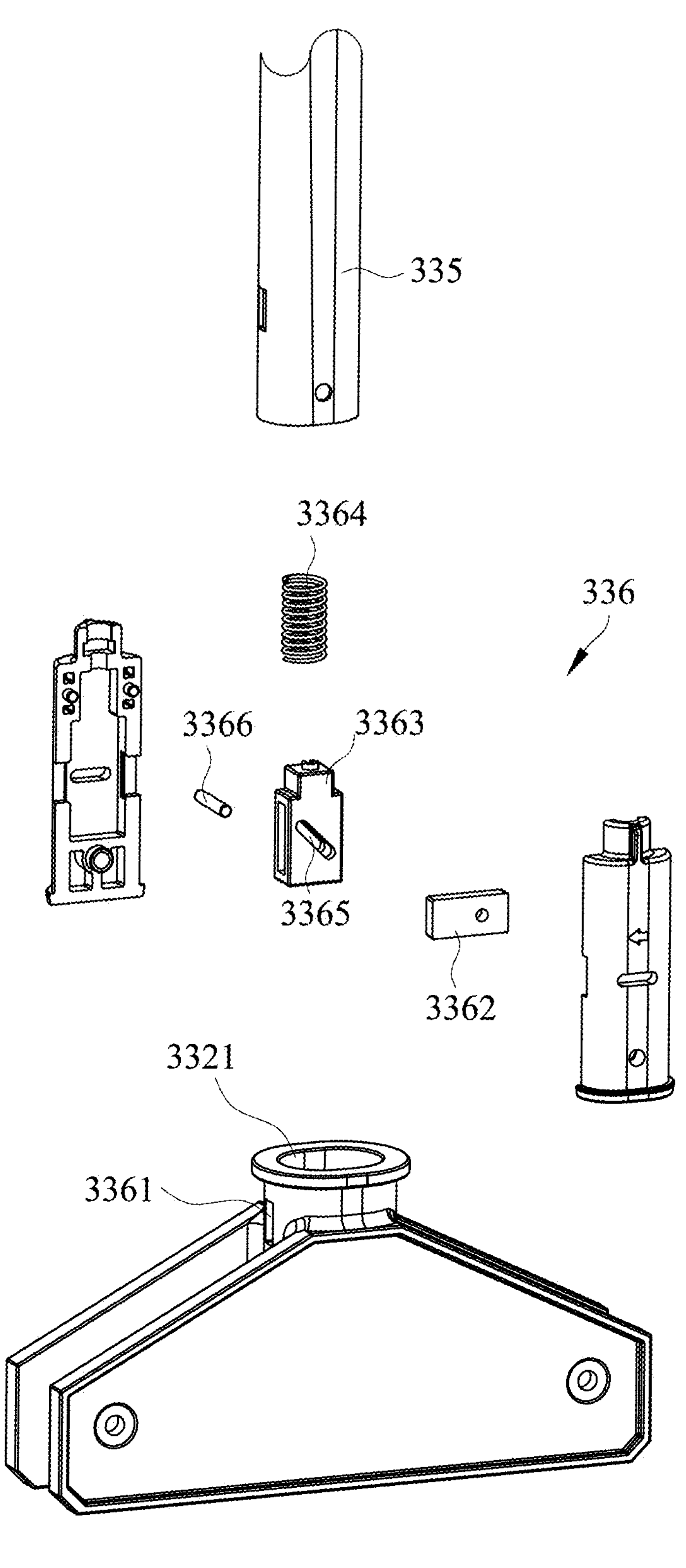
FIG. 8 is an exploded view of part C in FIG. 2.
Figure 9:
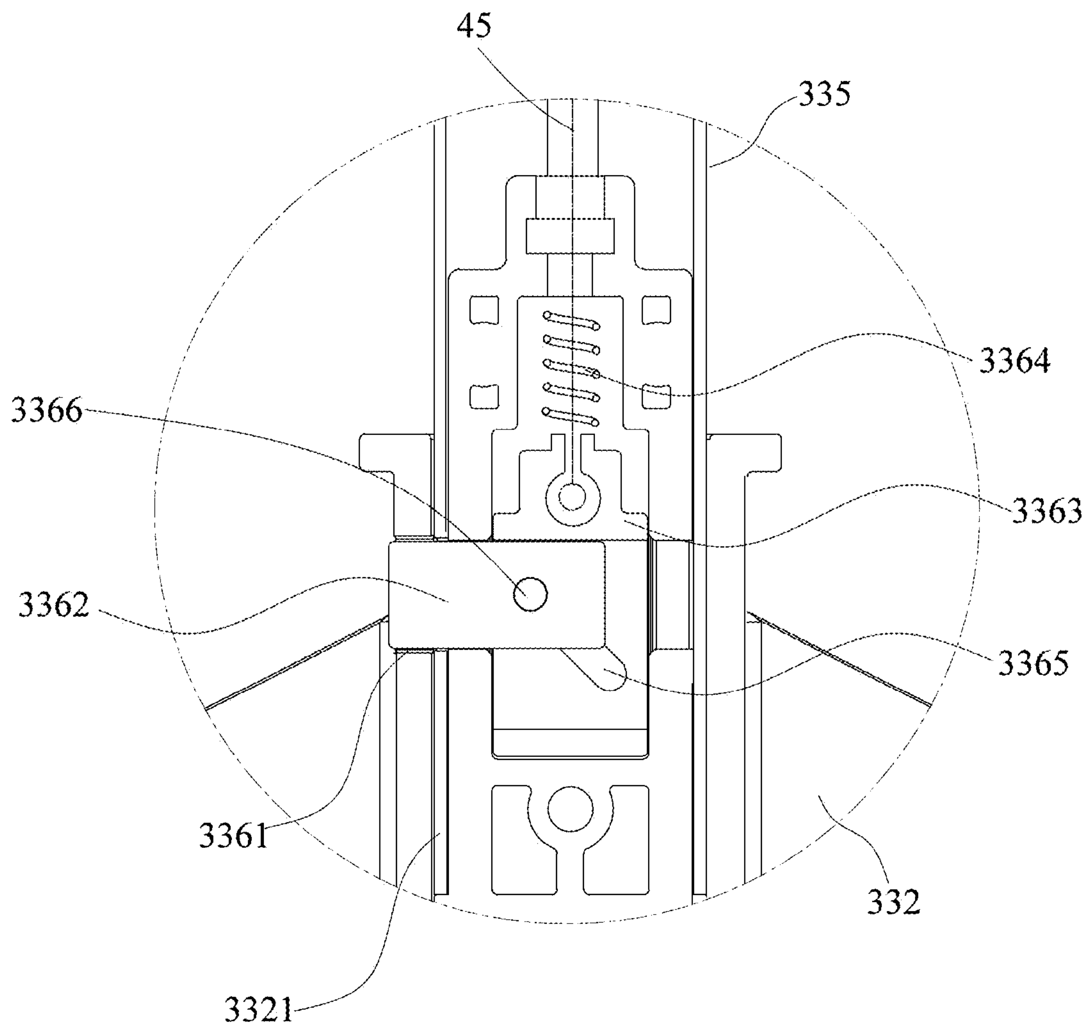
FIG. 9 is an enlarged, cross-sectional view of part F in FIG. 5.

Refer to FIG. 8 and FIG. 9. FIG. 8 is an exploded view of part C in FIG. 2. FIG. 9 is an enlarged, cross-sectional view of part F in FIG. 5.

As shown in FIG. 2, FIG. 5, FIG. 8 and FIG. 9, the right lateral subframe 33 comprises a central upright tube 335. The central upright tube 335 is disposed between the right lateral top tube 331 and the right lateral chassis 332. The central upright tube 335 vertically slidingly connects to the right lateral chassis 332. The right lateral chassis 332 has a through hole 3321. The central upright tube 335 is penetratingly disposed in the through hole 3321, allowing the central upright tube 335 to undergo vertical movement in the through hole 3321. A locking structure 336 is disposed between the central upright tube 335 and the through hole 3321. The locking structure 336 comprises an insertion hole 3361, a locking element 3362, a drive slider 3363 and a reset spring 3364. The insertion hole 3361 is disposed on the sidewall of the through hole 3321. The locking element 3362 horizontally slidingly connects to the lower portion of the central upright tube 335 and extends outward from the central upright tube 335 so as to be inserted into the insertion hole 3361. The drive slider 3363 is disposed at the lower portion of the central upright tube 335. The drive slider 3363 slides along the vertical direction of the central upright tube 335. The reset spring 3364 is disposed between the drive slider 3363 and the central upright tube 335. The reset spring 3364 presses against the drive slider 3363. A transmission structure capable of converting the vertical movement of the drive slider 3363 into the inward-outward sliding of the locking element 3362 is disposed between the drive slider 3363 and the locking element 3362. Thus, the locking element 3362 slides inward when the drive slider 3363 slides upward, whereas the locking element 3362 slides outward when the drive slider 3363 slides downward. The drive slider 3363 has a slot 3365. The slot 3365 extends toward the lower right. The slot 3365 is increasingly distant from the insertion hole 3361 in the top-to-bottom direction. The locking element 3362 has a positioning pin 3366. The positioning pin 3366 is inserted into the slot 3365 and is movable along the slot 3365. When the drive slider 3363 moves upward, the slot 3365 moves upward synchronously to thereby push the positioning pin 3366 to move inward, causing the locking element 3362 to retract into the central upright tube 335. Conversely, when the drive slider 3363 moves downward, the slot 3365 pushes the positioning pin 3366 to move outward, causing the locking element 3362 to protrude outward.

As shown in FIG. 5, FIG. 7 and FIG. 8, a linking movement structure 45 is disposed between the rear right locking structure 422 and the locking structure 336. The linking movement structure 45 comprises a connection cord. One end of the connection cord is connected to the rear right locking element 4222. The other end of the connection cord is connected to the drive slider 3363. The rear right locking element 4222 moves rightward to drive the drive slider 3363 moving upward through the connection cord. The rear right locking structure 422 and the locking structure 336 are linked in such a way that unlocking the rear right locking structure 422 manually can automatically unlock the locking structure 336 through the linking movement structure 45, allowing the locking structure 336 to be conveniently unlocked by one single person manually and facilitating the vertical movement of the right lateral top tube 331 and the central upright tube 335. The unlocking process requires the right hand to pull the front right unlocking button 4124 and the left hand to pull the rear right unlocking button 4224 so as to unlock the right lateral top tube 331 and the central upright tube 335, rendering the right lateral subframe 33 vertically-movable.

Figure 10:
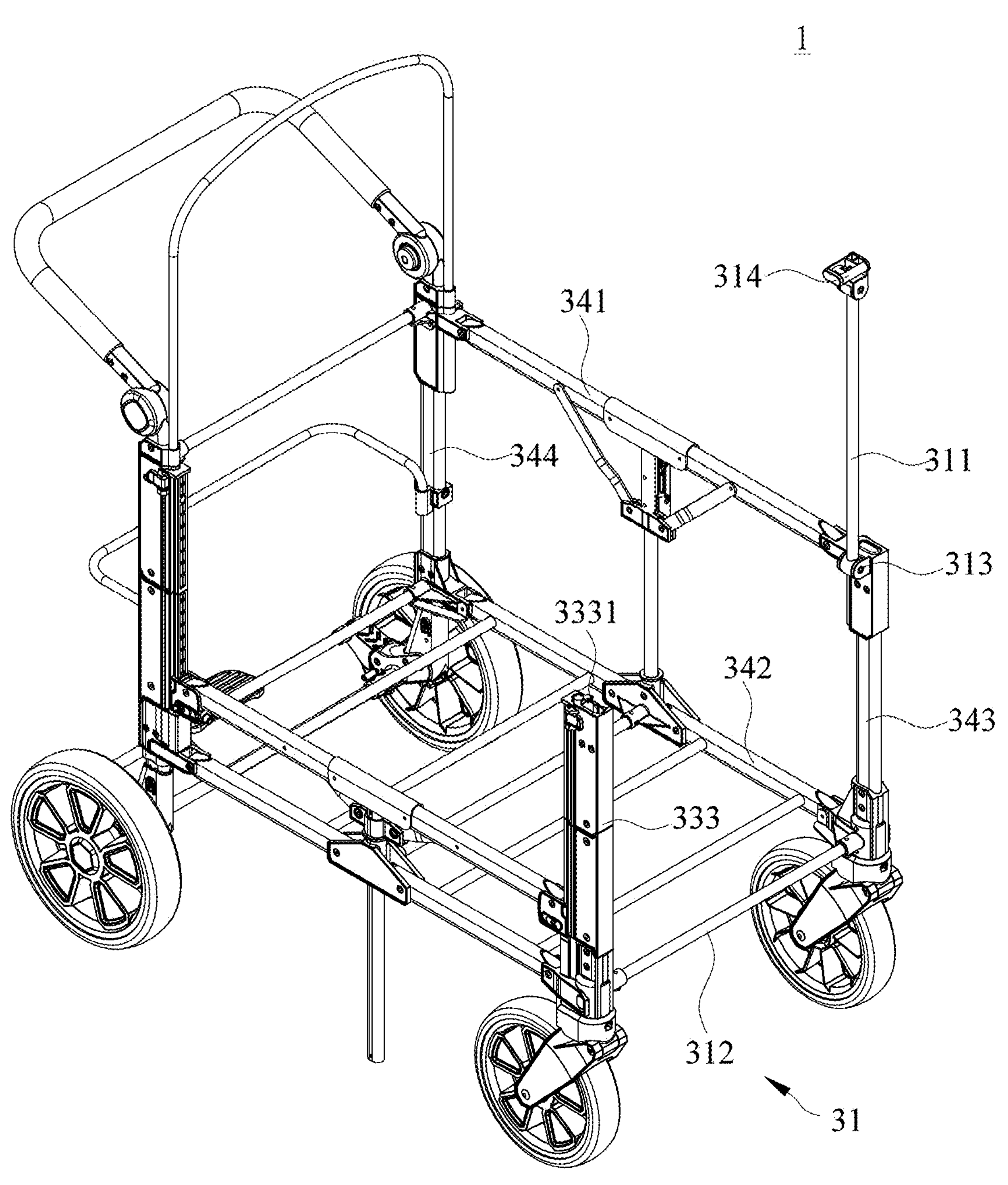
FIG. 10 is a perspective view of the vertically-movable, transmission-friendly, and controllable stroller regarding its operation according to embodiment 2 of the disclosure.

Referring to FIG. 10, there is shown a perspective view of the vertically-movable, transmission-friendly, and controllable stroller regarding its operation according to embodiment 2 of the disclosure.

As shown in FIG. 10, the front lateral subframe 31 comprises a front upper connection tube 311 and a front lower connection tube 312. One end of the front upper connection tube 311 is pivotally connected to the front left lateral upright tube 343 through an axle 313. The other end of the front upper connection tube 311 has an engaging element 314. The front right lateral upright tube 333 has an engaging slot 3331, allowing the engaging element 314 to movably engage with the engaging slot 3331. When the engaging element 314 separates from the engaging slot 3331, a baby or toddler can enter and exit the vertically-movable, transmission-friendly, and controllable stroller 1 conveniently.

Figure 11:
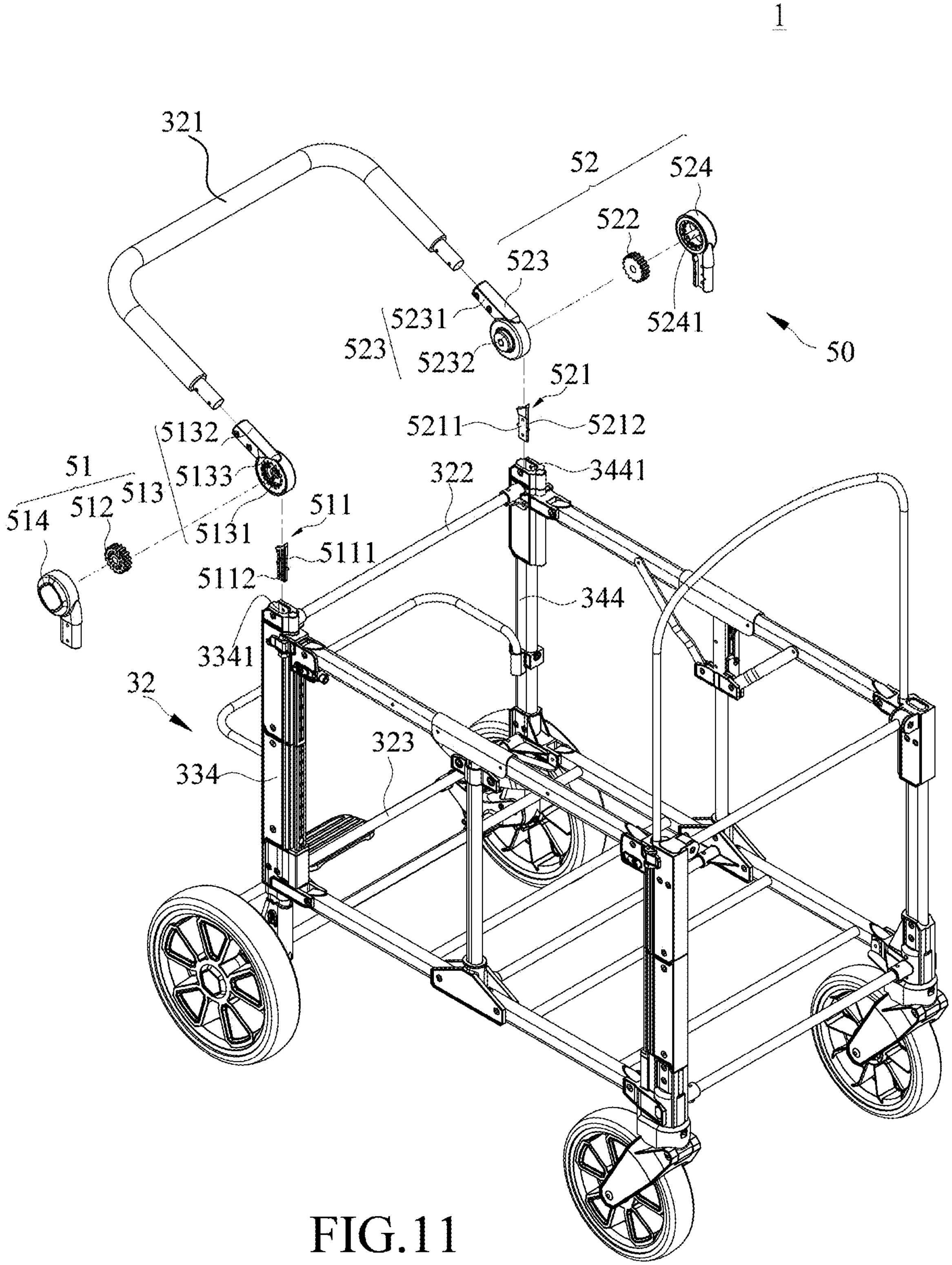
FIG. 11 is an exploded view of the stroller according to the disclosure, showing a detached handle.

Referring to FIG. 11, there is shown an exploded view of the stroller according to the disclosure, showing a detached handle.

As shown in FIG. 11, the rear lateral subframe 32 comprises a rear upper connection tube 322, a rear lower connection tube 323 and a pivotal joint structure 50. The rear right lateral upright tube 334 and the rear left lateral upright tube 344 have a right penetrating channel 3341 and a left penetrating channel 3441 respectively. The pivotal joint structure 50 has a right pivotal member 51 and a left pivotal member 52. The right pivotal member 51 comprises a right connection element 511, a right gear 512, an inner right fixing element 513 and an outer right fixing element 514. The right gear 512 is rotatably disposed in a third gear recess 5131 of the inner right fixing element 513 and a fourth gear recess (not shown) of the outer right fixing element 514. A first lateral surface 5111 of the right connection element 511 is engaged with the right penetrating channel 3341 and fixed in position therein. A second lateral surface 5112 of the right connection element 511 is engaged with the outer right fixing element 514 and fixed in position therein. The left pivotal member 52 comprises a left connection element 521, a left gear 522, an inner left fixing element 523 and an outer left fixing element 524. The left gear 522 is rotatably disposed in a first gear recess (not shown) of the inner left fixing element 523 and a second gear recess 5241 of the outer left fixing element 524. A first lateral surface 5211 of the left connection element 521 is engaged with the left penetrating channel 3441 and fixed in a position therein, whereas a second lateral surface 5212 of the left connection element 521 is engaged with the outer left fixing element 524 and fixed in position therein, allowing the right pivotal member 51 and the left pivotal member 52 to be connected to the rear right lateral upright tube 334 and the rear left lateral upright tube 344 respectively. The inner right fixing element 513 has a right extension member 5132 and a right body portion 5133. The right extension member 5132 and the right body portion 5133 are connected. The third gear recess 5131 is disposed in the right body portion 5133. The right extension member 5132 has a left receiving space. The front end of the handle 321 is disposed in the left receiving space. The inner left fixing element 523 has a left extension member 5231 and a left body portion 5232. The left extension member 5231 and the left body portion 5232 are connected. The second gear recess 5241 is disposed in the left body portion 5232. The left extension member has a receiving space. The front end of the handle 321 is disposed in the receiving space, allowing the handle 321 to undergo multi-segment adjustment.

Therefore, the vertically-movable, transmission-friendly, and controllable stroller of the disclosure has advantages as summarized below. First, the right lateral subframe 33 is vertically-movable to thereby move upward to function as a conventional stroller and move downward to function as a sofa. Second, the rear right locking structure 422 and the locking structure 336 are linked in such a way that unlocking the rear right locking structure 422 manually can automatically unlock the locking structure 336 through the linking movement structure 45, allowing the locking structure 336 to be conveniently unlocked by one single person manually and facilitating the vertical movement of the right lateral top tube 331 and the central upright tube 335.

LEGEND

- 1 vertically-movable, transmission-friendly, and controllable stroller
- 10 front wheel component
- 101 front wheel hanger
- 102 front lateral right wheel
- 103 front lateral left wheel
- 20 rear wheel component
- 201 rear wheel hanger
- 202 rear lateral right wheel
- 203 rear lateral left wheel
- 30 frame
- 31 front lateral subframe
- 311 front upper connection tube
- 312 front lower connection tube
- 313 axle
- 314 engaging element
- 32 rear lateral subframe
- 321 handle
- 322 rear upper connection tube
- 323 rear lower connection tube
- 33 right lateral subframe
- 331 right lateral top tube
- 332 right lateral chassis
- 3321 through hole
- 333 front right lateral upright tube
- 3331 engaging slot
- 334 rear right lateral upright tube
- 3341 right penetrating channel
- 335 central upright tube
- 336 locking structure
- 3361 insertion hole
- 3362 locking element
- 3363 drive slider
- 3364 reset spring
- 3365 slot
- 3366 positioning pin
- 34 left lateral subframe

341 left lateral top tube
3411 engaging slot
342 left lateral chassis
343 front left lateral upright tube
344 rear left lateral upright tube
3441 left penetrating channel
40 rail component
41 front right rail
411 front right slider
412 front right locking structure
4121 front right insertion hole
4122 front right locking element
4123 front right reset spring
4124 front right unlocking button
42 rear right rail
421 rear right slider
422 rear right locking structure
4221 rear right insertion hole
4222 rear right locking element
4223 rear right reset spring
4224 rear right unlocking button
43 front right slot
44 rear right slot
45 linking movement structure
50 pivotal joint structure
51 right pivotal member
511 right connection element
5111 first lateral surface
5112 second lateral surface
512 right gear
513 inner right fixing element
5131 third gear recess
5132 right extension member
5133 right body portion
514 outer right fixing element
5141 second gear recess
52 left pivotal member
521 left connection element
5211 first lateral surface
5212 second lateral surface
522 left gear
523 inner left fixing element
5231 left extension member
5232 left body portion
524 outer left fixing element
5241 second gear recess

What is claimed is:

1. A vertically-movable, transmission-friendly, and controllable stroller, comprising:

a front wheel component comprising a front wheel hanger, a front lateral right wheel mounted on a bottom of the front wheel hanger, and a front lateral left wheel mounted on the bottom of the front wheel hanger;

a rear wheel component comprising a rear wheel hanger, a rear lateral right wheel mounted on a bottom of the rear wheel hanger, and a rear lateral left wheel mounted on the bottom of the rear wheel hanger;

a frame comprising a front lateral subframe, a rear lateral subframe, a right lateral subframe and a left lateral subframe, the front lateral subframe having a bottom pivotally connected to the front wheel component, the rear lateral subframe not only having a bottom pivotally connected to the rear wheel component but also connecting to a handle extending toward a rear of the rear lateral subframe, the right lateral subframe comprising a right lateral top tube, a right lateral chassis, a front right lateral upright tube and a rear right lateral upright tube, and the left lateral subframe comprising a left lateral top tube, a left lateral chassis, a front left lateral upright tube and a rear left lateral upright tube; and a rail component comprising a front right rail and a rear right rail, with the front right and rear right rails disposed on the front right lateral upright tube and the rear right lateral upright tube respectively, allowing left and right ends of the right lateral top tube to be vertically slidingly connected between the front right lateral upright tube and the rear right lateral upright tube, wherein the front right rail and the rear right rail have thereon a front right slider and a rear right slider respectively, allowing the left and right ends of the right lateral top tube to be fixed to the front right slider and the rear right slider by a front right locking structure and a rear right locking structure respectively.

2. The vertically-movable, transmission-friendly, and controllable stroller of claim 1, wherein the front right locking structure comprises a front right insertion hole, a front right locking element, a front right reset spring and a front right unlocking button, the front right insertion hole being disposed on the front right lateral upright tube, the front right locking element slidingly in a left-right direction connecting to the front right slider and protruding leftward into the front right insertion hole, the front right reset spring being disposed between the front right locking element and the front right slider and pressing leftward against the front right locking element, the front right locking element having the front right unlocking button, and the rear right locking structure comprises a rear right insertion hole, a rear right locking element, a rear right reset spring and a rear right unlocking button, the rear right insertion hole being disposed on the rear right lateral upright tube, the rear right locking element slidingly in the left-right direction connecting to the rear right slider and protruding rightward into the rear right insertion hole, the rear right reset spring being disposed between the rear right locking element and the rear right slider and pressing rightward against the rear right locking element, and the rear right locking element having the rear right unlocking button.

3. The vertically-movable, transmission-friendly, and controllable stroller of claim 1, wherein the right lateral subframe comprises a central upright tube disposed between the right lateral top tube and the right lateral chassis, allowing the central upright tube to be vertically slidingly connected to the right lateral chassis.

4. The vertically-movable, transmission-friendly, and controllable stroller of claim 3, wherein the right lateral chassis has a through hole, with the central upright tube penetratingly disposed in the through hole to move vertically therein, and a locking structure is disposed between the central upright tube and the through hole.

5. The vertically-movable, transmission-friendly, and controllable stroller of claim 4, wherein the locking structure comprises an insertion hole, a locking element, a drive slider and a reset spring, the insertion hole being disposed on a sidewall of the through hole, the locking element horizontally slidingly connecting to a lower portion of the central upright tube and extending outward from the central upright tube so as to be inserted into the insertion hole, the drive slider being disposed at the lower portion of the central upright tube and sliding along a vertical direction of the central upright tube, and the reset spring being disposed between the drive slider and the central upright tube and pressing against the drive slider.

6. The vertically-movable, transmission-friendly, and controllable stroller of claim 5, wherein the drive slider has a slot being increasingly distant from the insertion hole in a top-to-bottom direction, and the locking element has a positioning pin insertedly disposed in the slot and movable along the slot.

7. The vertically-movable, transmission-friendly, and controllable stroller of claim 5, wherein the front lateral subframe comprises a front upper connection tube and a front lower connection tube, the front upper connection tube having an end pivotally connected to the front left lateral upright tube through an axle and having another end having an engaging element, and the front right lateral upright tube has an engaging slot, allowing the engaging element to movably engage with the engaging slot.

8. The vertically-movable, transmission-friendly, and controllable stroller of claim 1, wherein the rear lateral subframe comprises a rear upper connection tube, a rear lower connection tube and a pivotal joint structure, wherein the rear right lateral upright tube and the rear left lateral upright tube each have a penetrating channel, and the pivotal joint structure has a right pivotal member and a left pivotal member, the right and left pivotal members each comprising a connection element, a gear, an inner fixing element and an outer fixing element, the gear being rotatably disposed in a first gear recess of the inner fixing element and a second gear recess of the outer fixing element, the connection element having a first lateral surface being engaged with the penetrating channel and fixed in position therein and having a second lateral surface being engaged with the outer fixing element and fixed in position therein to allow the right pivotal member and the left pivotal member to connect to the rear right lateral upright tube and the rear left lateral upright tube respectively, the inner fixing element having an extension member and a body portion connected to the extension member, the second gear recess being disposed in the body portion, the extension member having a receiving space, and the handle having a front end disposed in the receiving space.

9. The vertically-movable, transmission-friendly, and controllable stroller of claim 1, wherein a linking movement structure is disposed between the rear right locking structure and the locking structure and comprises a connection cord, the connection cord having an end connected to the rear right locking element and having another end connected to the drive slider, and the rear right locking element moves rightward to drive the drive slider moving upward through the connection cord.

* * * * *